(12) United States Patent
Mehringer et al.

(10) Patent No.: US 9,496,800 B2
(45) Date of Patent: Nov. 15, 2016

(54) METHOD FOR ACTIVATING A RECTIFIER, WHICH HAS ACTIVE SWITCHING ELEMENTS

(75) Inventors: Paul Mehringer, Stuttgart (DE); Uwe Schiller, Sersheim (DE); Holger Heinisch, Reutlingen (DE); Markus Baur, Rottenburg (DE); Jochen Kurfiss, Lomersheim (DE); Gerhard Walter, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 142 days.

(21) Appl. No.: 14/008,322

(22) PCT Filed: Jan. 2, 2012

(86) PCT No.: PCT/EP2012/050010
§ 371 (c)(1),
(2), (4) Date: Dec. 4, 2013

(87) PCT Pub. No.: WO2012/130479
PCT Pub. Date: Oct. 4, 2012

(65) Prior Publication Data
US 2014/0104908 A1   Apr. 17, 2014

(30) Foreign Application Priority Data
Mar. 29, 2011 (DE) .................. 10 2011 006 316

(51) Int. Cl.
*H02M 7/217* (2006.01)
*H02M 1/32* (2007.01)
*H02M 7/219* (2006.01)
*H02H 7/125* (2006.01)
*H02P 9/48* (2006.01)

(52) U.S. Cl.
CPC ............... *H02M 7/219* (2013.01); *H02M 1/32* (2013.01); *H02M 2001/327* (2013.01); *H02P 9/48* (2013.01)

(58) Field of Classification Search
CPC .................... H02H 7/127; H02H 7/062; Y02B 70/126; H02M 3/33592; H02M 7/215; H02M 7/217; H02M 7/219; H02M 1/32; H02M 1/34
USPC .................... 363/52, 53, 84, 89, 125, 127
See application file for complete search history.

(56) References Cited

U.S. PATENT DOCUMENTS

| 6,917,234 B2 | 7/2005 | Horn et al. |
| 7,221,127 B2 * | 5/2007 | Masson et al. ................. 322/28 |
| 7,528,645 B2 | 5/2009 | Scheikl et al. |
| 2008/0247197 A1 | 10/2008 | Rivet et al. |

(Continued)

FOREIGN PATENT DOCUMENTS

| DE | 102 60 650 | 7/2004 |
| DE | 103 39 689 | 3/2005 |

(Continued)

*Primary Examiner* — Gary L Laxton
(74) *Attorney, Agent, or Firm* — Norton Rose Fulbright US LLP

(57) ABSTRACT

A method for activating a rectifier having active switching elements in the event of a load dump, the active switching elements being activated during the voltage clamping in such a way that the clamp voltage in at least one switching branch complies with a signal form predefined as a function of time within at least one half-period of the current to be rectified.

17 Claims, 13 Drawing Sheets

(56) References Cited

U.S. PATENT DOCUMENTS

2008/0291699 A1* 11/2008 Sells .................... H02M 7/219
                                                             363/17

FOREIGN PATENT DOCUMENTS

| DE | 10 2005 051004 | 4/2007 |
|----|----------------|--------|
| DE | 10 2007 060 219 | 6/2009 |
| DE | 10 2010 001713 | 8/2011 |
| EP | 0 777 309 | 6/1997 |
| JP | 09-219938 | 8/1997 |
| JP | 2003-244864 | 8/2003 |
| JP | 2009-207077 | 9/2009 |
| WO | 2006/114362 | 11/2006 |
| WO | WO 2006/114363 | 11/2006 |

* cited by examiner

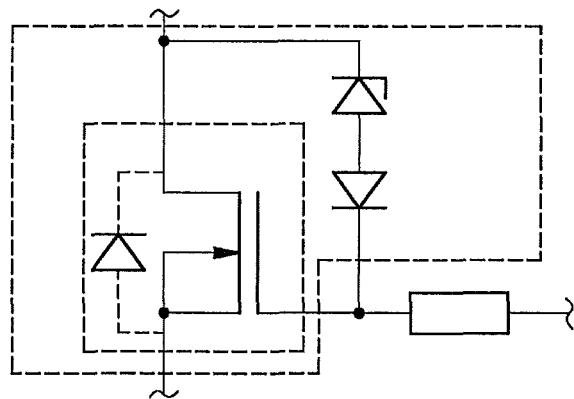
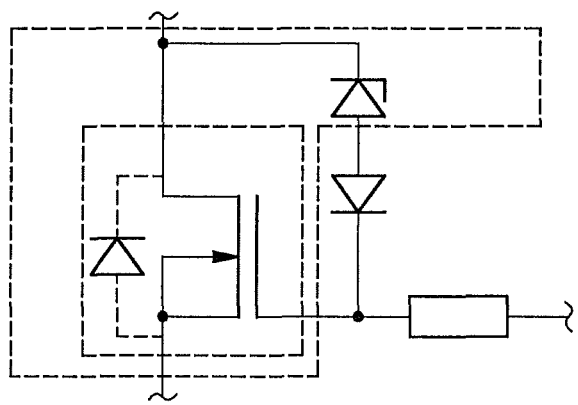
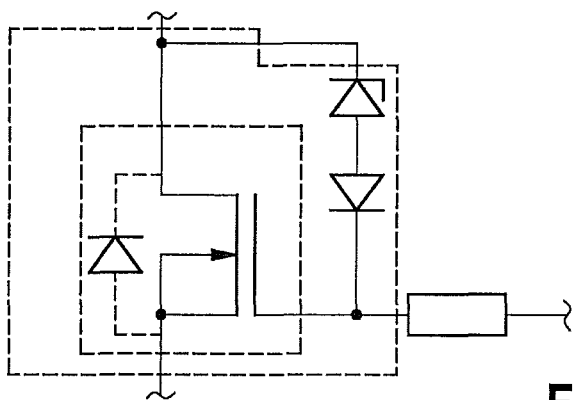
Fig. 15

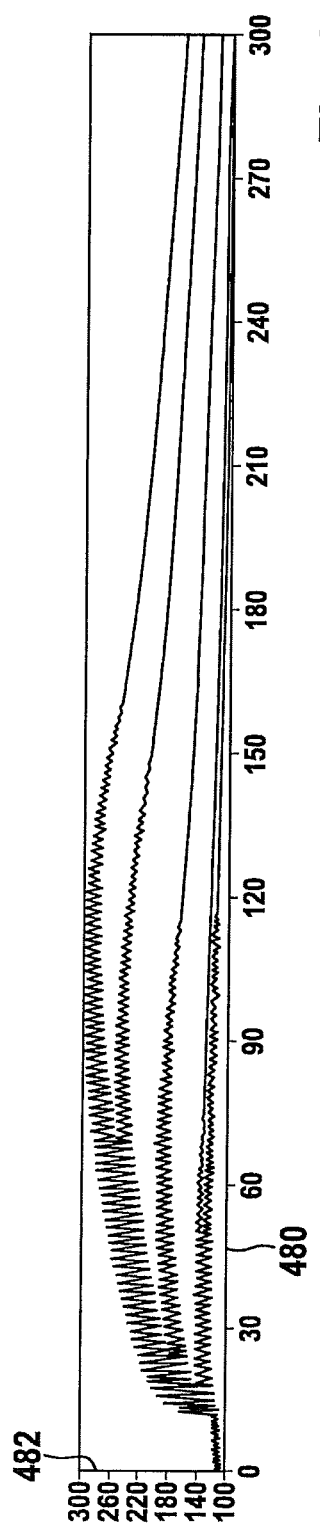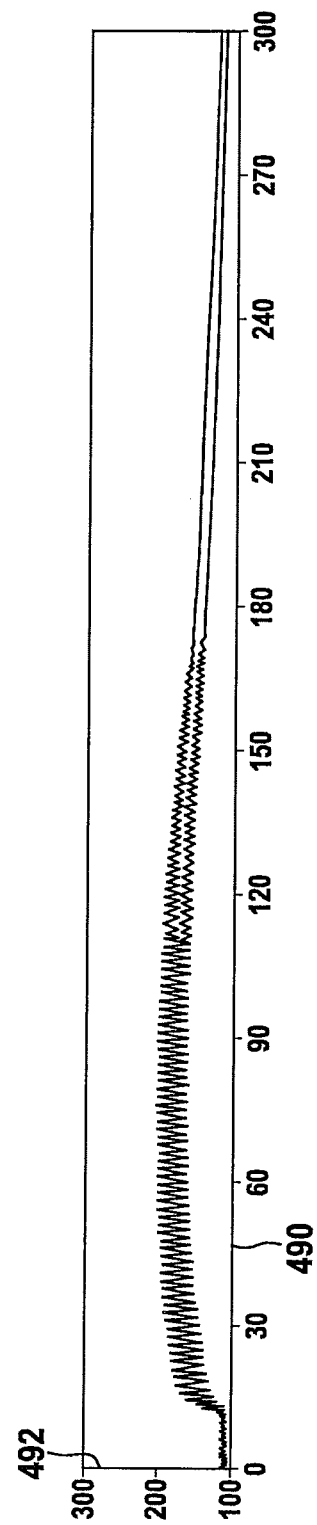

METHOD FOR ACTIVATING A RECTIFIER, WHICH HAS ACTIVE SWITCHING ELEMENTS

FIELD OF THE INVENTION

The present invention relates to a method for activating a rectifier having active switching elements in the event of a load dump, an activating circuit for activating a rectifier having active switching elements in the event of a load dump, a rectifier having active switching elements, and an electric generator.

BACKGROUND INFORMATION

Rectifiers are generally used for supplying direct current systems from three-phase current systems, such as in the public three-phase system. These rectifiers are mostly configured as a bridge circuit, diodes being used as rectifier elements. The diodes do not need any additional activating circuit, since they transition automatically at the correct point in time into the conducting or blocking state.

Bridge rectifiers are also used as rectifiers in three-phase generators for motor vehicles. The power loss implemented in the diode rectifiers results from the diode configuration and the current to be rectified. These losses may be reduced only insignificantly by circuitry-related measures, such as parallel switching of diodes. However, if the diodes are replaced by active switches, e.g., MOSFETs, these losses may be considerably reduced. The use of active switches, however, requires a controller which switches the switches on and off at the correct point in time.

A critical operating state of an active rectifier is the load dump. A load dump is present if the load cable drops or consumers are abruptly turned off in the case of an excited machine having output current. The generator usually continues to deliver energy, which must be converted in the rectifier, for 300 ms to 500 ms in order to protect the vehicle electrical system against damage due to overvoltage.

In conventional diode rectifiers, this energy loss may be converted into heat. Here, the diodes offer an adequate integrated circuit packaging having low thermal impedances. Furthermore, the Zener diodes offer the advantage that the Zener voltage rises with rising temperature. In this way, almost even distribution of the current load of the branches is achieved among the individual branches. In the thermally balanced state, the Zener voltages are initially not identical due to manufacturing deviations. Switching branches having a lower Zener voltage are subjected to more current. A self-inhibiting effect occurs, which results in an almost even distribution of the current, due to the fact that the Zener voltage rises with rising temperature.

In the case of active rectifiers, MOSFETs are usually used as power switches. In known circuits for voltage clamping, the clamp voltage is a function of the threshold voltage of the MOSFETs, which is why the decrease in the threshold voltage results in a decrease in the clamp voltage. Since the threshold voltages of MOSFETs have negative temperature coefficients, the clamp voltage of such active rectifiers decreases when the temperature increases. This results in an uneven distribution of the current resulting in an uneven distribution of the temperature, which reinforces the uneven distribution of the current and is demonstrated as a positive feedback effect.

In known circuits for voltage clamping, the clamp voltage is composed of the breakdown voltage of a Zener diode, or a chain of Zener diodes, and the threshold voltage of the MOSFET. Since the Zener diodes are thermally not coupled or coupled only insufficiently to the MOSFET, their positive temperature coefficient cannot compensate for the negative temperature coefficient of the threshold voltage of the MOSFET.

An output stage having an even distribution of the Zener voltage and a method for operating this output stage are known from the publication WO 2006/114362 A2. The above-described output stage is used for switching inductive loads and includes at least two parallel-switched individual output stages. In parallel-switched output stages, problems may occur during switch-off due to tolerances, thus resulting in the output stage being strictly limited in its range of application. To avoid this from happening, it is proposed to carry out a thermal coupling between a Zener diode and a switching transistor which are components of an individual output stage, thus causing the output stage extinction voltage to be evenly distributed.

SUMMARY OF THE INVENTION

Against this background, a method for activating a rectifier having the features described herein, an activating circuit according to the description herein, a rectifier according to the description herein, and an electric generator according to the description herein are presented. Embodiments result from the further descriptions herein.

The presented method is used to distribute the power converted during the voltage clamping during a load dump as evenly as possible to the power transistors of all switching branches in order to achieve the most homogeneous heating possible of the involved power transistors. A method is thus represented for evenly distributing the power loss when the voltage is delimited in rectifiers.

Further advantages and embodiments of the present invention result from the appended drawings and the description.

It is understood that the above-mentioned features and the features to be elucidated below are usable not only in the given combination, but also in other combinations or alone without departing from the scope of the present invention.

BRIEF DESCRIPTION OF THE DRAWINGS

FIG. 15 shows alternative descriptions of a four-pole MOSFET.

FIG. 17 shows in a graph the temperature distribution using drain-gate control.

FIG. 18 shows in a graph the temperature distribution using drain-source control.

DETAILED DESCRIPTION

Figure 1:
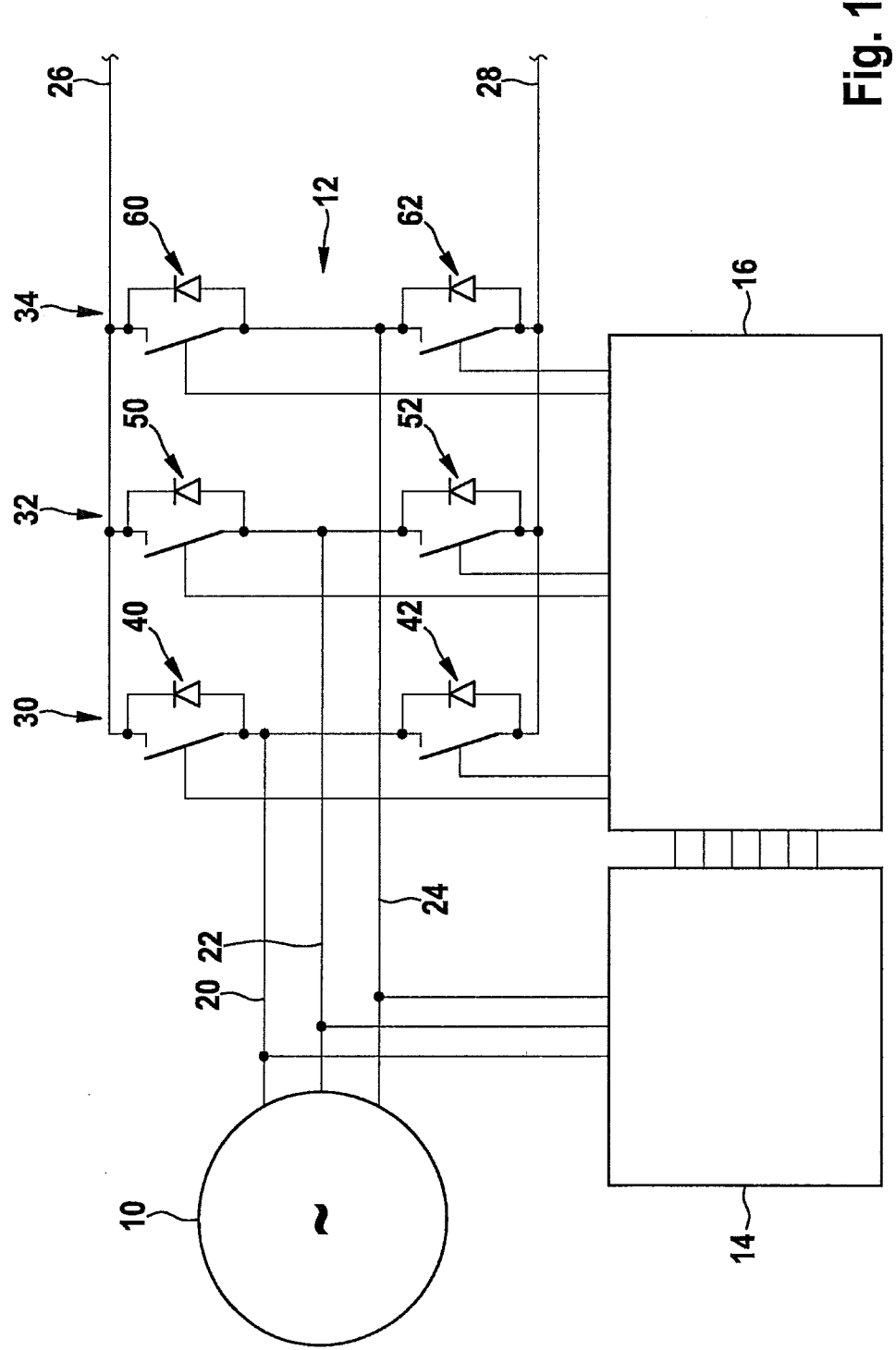
FIG. 1 shows one specific embodiment of the presented rectifier having active switches.

The present invention is illustrated schematically in the drawings on the basis of specific embodiments and is described in detail in the following with reference to the drawings. The method of the present invention is described in the following with reference to a 3-phase system, but it is easily transferrable to multi-phase systems.

FIG. 1 shows a generator 10, a rectifier 12, in this case a bridge rectifier, an activating circuit 14 for generating activating signals, and an activation 16 of switches (e.g., gate drivers).

Generator 10 generates three phase signals, namely phase U 20, phase V 22, and phase W 24. These three phases 20, 22, and 24 are fed into rectifier 12 in which switching elements are situated between a plus pole 26 and a minus pole 28 in a first branch 30, a second branch 32, and a third branch 34.

Here, first branch 30 includes a first switching element 40 and a second switching element 42, second branch 32 includes a third switching element 50 and a fourth switching element 52, and third branch 34 includes a fifth switching element 60 and a sixth switching element 62. Switching elements 40, 42, 50, 52, 60, 62 each include a switch having a parallel-switched diode and may be configured as MOSFETs, each having a source, drain, and gate connection.

The three phases U 20, V 22, and W 24 are converted by rectifier 12 into DC values.

Circuit 14 for generating the activating signals evaluates the three phases 20, 22, and 24 and generates control signals using which activation 16 takes place for the switches of switching elements 40, 42, 50, 52, 60, and 62.

The switch-on conditions of the active switches occur via an evaluation of the voltage at the diodes or inverse diodes of the MOSFETs. In the case of a forward voltage of typically 0.7 V, a reliable detection of the switch-on condition is possible at a limiting value of 0.35 V, for example. As soon as the activation has taken place, this signal breaks down, since the diode forward voltage through the RDS_ON of the MOSFET is bridged. Therefore, a voltage measurement to ascertain the switch-off point in time is problematic.

It is to be noted that a significantly higher signal may be achieved as a result of a loss-free current measurement. It is important that the voltage measurement is loss-free, since the efficiency gain would be eliminated as a result of the introduction of a shunt.

An activation on the basis of a voltage measurement is advantageous compared to an activation on the basis of a current measurement, since the efficiency may be optimally used in this way.

FIG. 1 shows a simplified configuration for an active rectifier. The exact configuration of activating circuit 14 is not explained in greater detail in this context.

Figure 2:
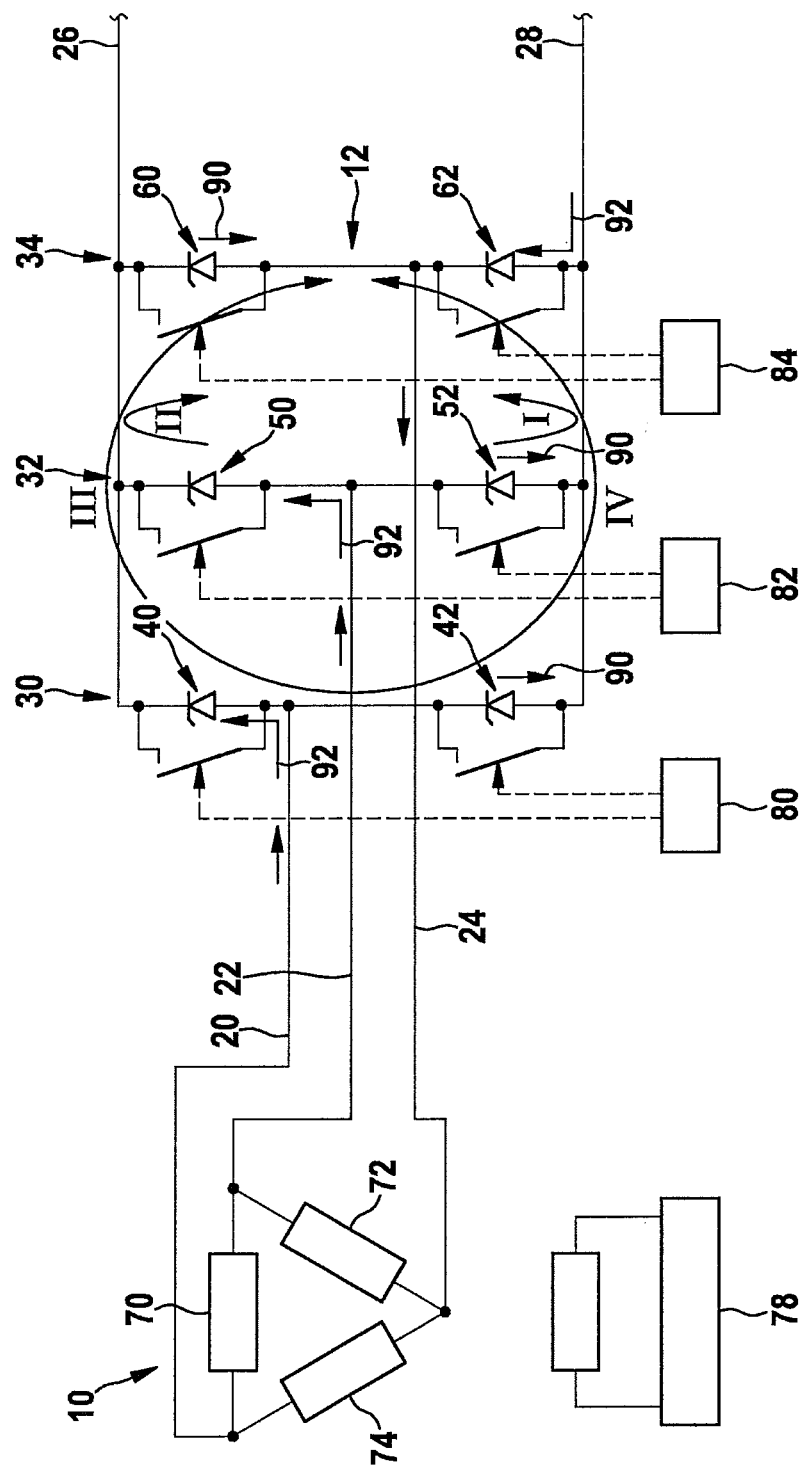
FIG. 2 shows the current paths in the presented rectifier during a load dump.

FIG. 2 shows the circuit configuration according to FIG. 1 having the resulting current paths. Here, generator 10 is shown to have three stator windings 70, 72, and 74. Furthermore, the illustration shows a controller 78, a first control unit 80, a second control unit 82, and a third control unit 84.

In the case of a load dump, current paths according to FIG. 2 result. In this case, a point in time is selected as an example having a positive current from phases U 20 and V 22 as well as a negative current in phase W 24. The excess current from phase V 22 has now two possible current paths to reach phase W 24, namely either via switching element 50 (high side V) and switching element 60 (high side W), which corresponds to path II, or via switching element 52 (low side V) and switching element 62 (low side W), which corresponds to path I.

Both current paths start at phase connection V and end at phase connection W. This also applies to paths III and IV having phases U and W. Thus, the paths are equivalent to the outside and the current will take the path having the lower counter-voltage. Now, since the clamp voltages marked with shaded arrows 90 are higher than the forward breakdown voltages marked with the other arrows 92 by one order of magnitude, the occurring counter-voltages are dominated by the Zener voltages and the current will select the path having the lower clamp voltage.

Combined with the negative temperature coefficient (TC) described in the following, this effect results in an uneven load of the output stages, the unevenness worsening in the course of the load drop due to an occurring positive feedback effect.

In order to generate an even energy distribution of a load dump among the six switches involved in the present example, in the active rectifier, the negative temperature coefficient of the threshold voltage of the MOSFETs must be compensated for by a suitable countermeasure.

Figure 3:
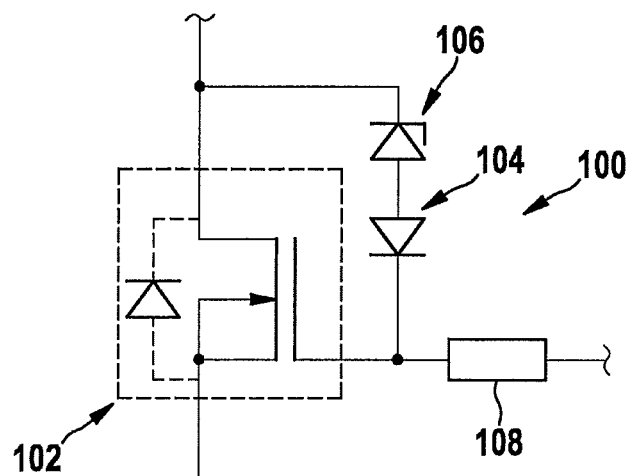
FIG. 3 shows a configuration of a clamping circuit for handling a load dump.

FIG. 3 shows a typical configuration of a clamping circuit for handling a load dump which is designated overall by reference numeral 100.

It includes a MOSFET 102, a diode 104, a Zener diode 106, and a resistor 108.

For the configuration shown in FIG. 3, clamp voltage U_DS results between drain and source:

$$U\_DS = U\_Z + U\_GS$$

Since MOSFET 102 is operated at a working point at a very steep characteristic curve, small changes in the threshold voltage significantly influence the drain current of the MOSFET.

Figure 4:
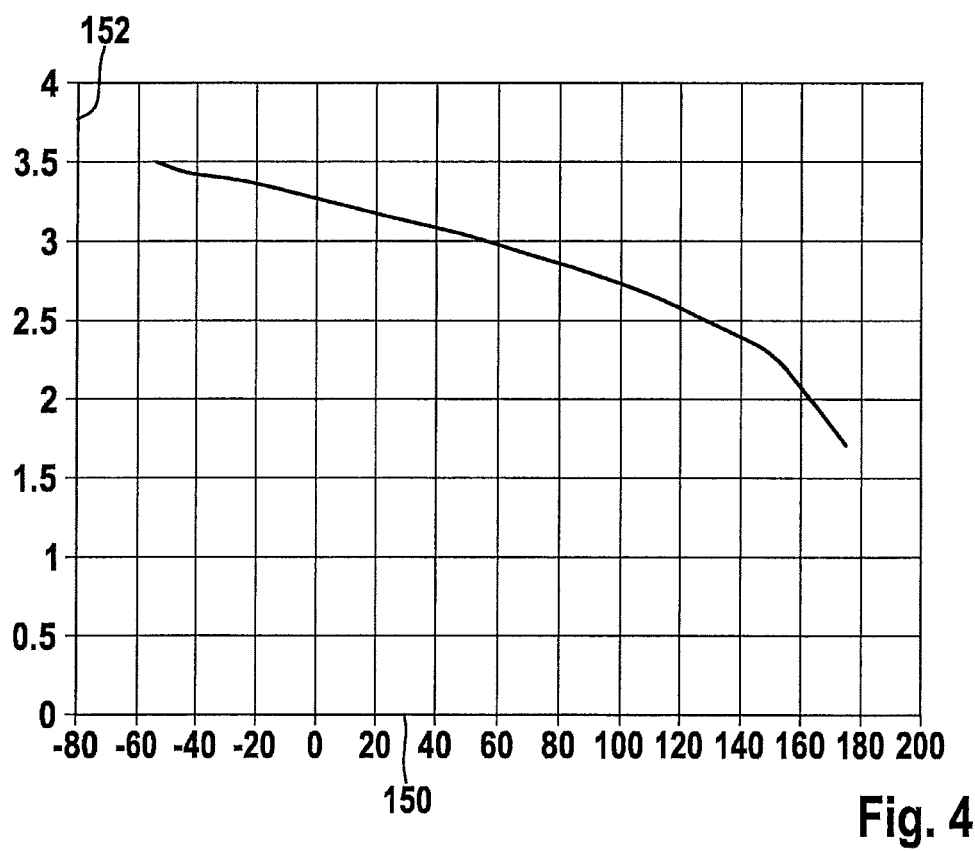
FIG. 4 shows in a graph that the threshold voltage of a field effect transistor is a function of the temperature.

FIG. 4 shows in a graph that the threshold voltage is a function of the temperature for a small drain saturation current. Here, the temperature is plotted on an abscissa 150 in ° C. and the threshold voltage is plotted on an ordinate 152 in V.

FIG. 4 thus illustrates that the threshold voltage is a function of the temperature. Since the threshold voltages of MOSFETs have negative temperature coefficients, the clamp voltage of such circuits decreases with rising temperature. This causes an uneven current load of the switching branches with the result of an uneven temperature distribution, which is demonstrated as a positive feedback effect and may have the thermal overload of individual MOSFETs as a consequence.

In rectifier diodes of passive rectifiers, the avalanche effect dominates in the blocking operation, which is why these diodes have positive temperature coefficients of the breakdown voltage. In passive rectifiers, the power loss converted during voltage clamping therefore is distributed almost evenly among the involved branches.

Figure 5:
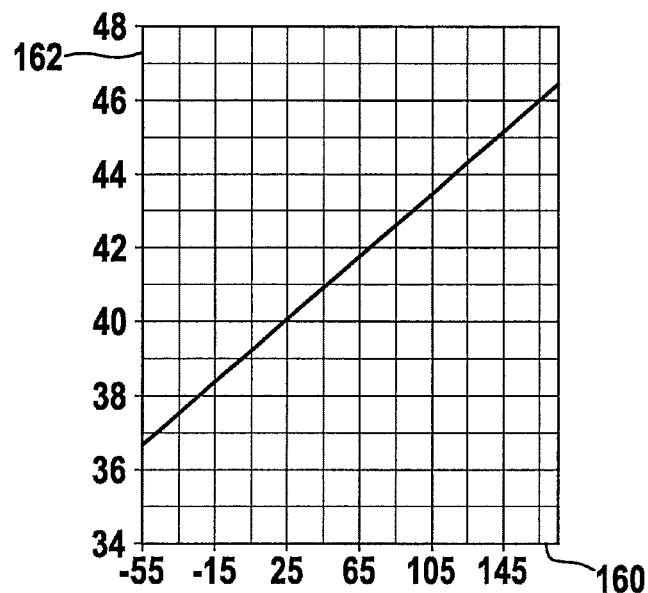
FIG. 5 shows in a graph that the avalanche breakdown voltage is a function of the temperature.

FIG. 5 shows, in this case using an example of a MOSFET, that the avalanche breakdown voltage is a function of the temperature. Here, the temperature is plotted on an abscissa 160 in ° C. and the breakdown voltage is plotted on an ordinate 162 in V.

It is to be noted that in generators for motor vehicles, time periods of approximately 200 ms to 500 ms are necessary to reduce the excitation current during a load dump event. Corresponding time periods therefore apply for the clamping operation of the rectifiers during a load dump event.

In the presented method, it is now provided in one embodiment to run the effect of the increasing clamp voltage in a considerably lower time scale in a time-controlled manner. Here, it is exploited that a load dump consists of chronologically returning events similar to sinusoidal half-waves. The frequency of the sinusoidal half-waves is in this case a function of the pole pair number of the instantaneous rotational speed of the used electric machine. Now, the clamp voltage within every single sinusoidal half-wave is supposed to start at an established level and increase within a millisecond by 2 V, for example.

Figure 6:
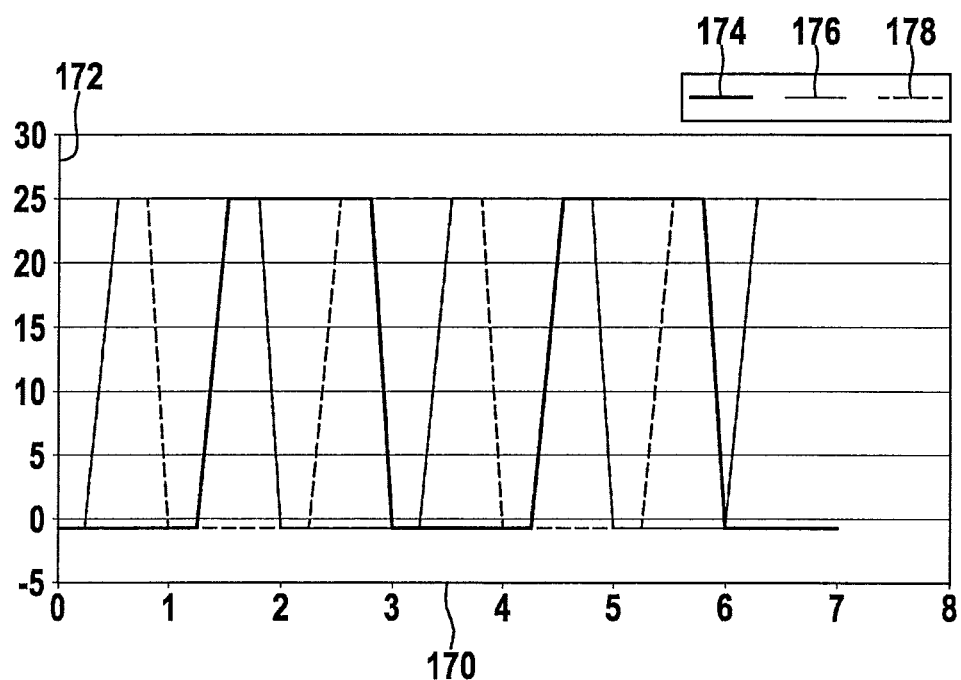
FIG. 6 shows in a graph the progression of three phase voltages during a load dump according to the related art.

FIG. 6 shows the progression of the three phase voltages during the load dump event for a three-phase system according to the related art. Here, the time is plotted on an abscissa 170 in ms. The voltage is plotted on an ordinate 172 in V. The illustration thus shows as an example the progressions of the voltages of phases U 174, V 176, and W 178 for a load dump event according to the related art.

Figure 7:
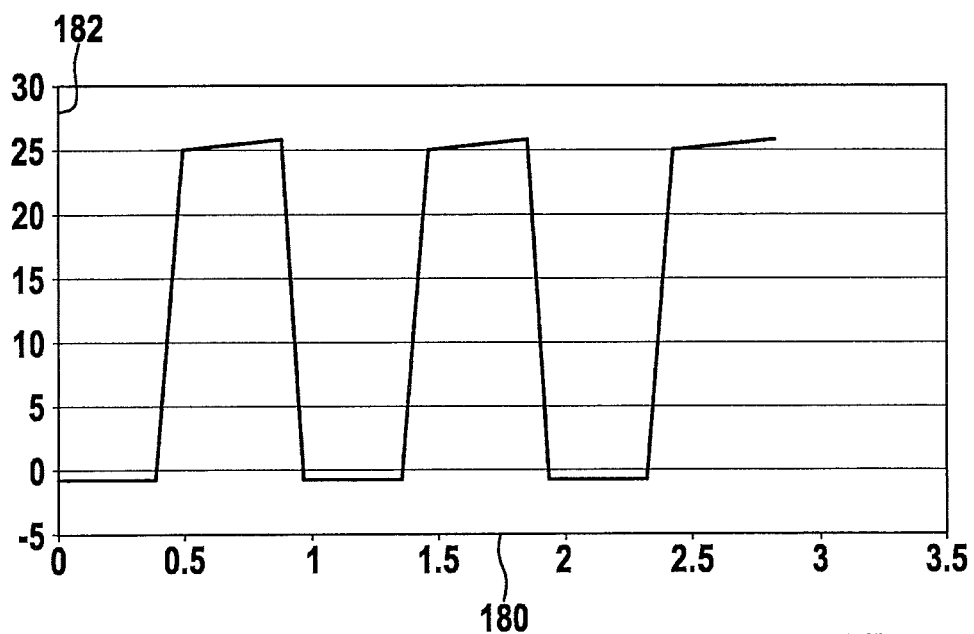
FIG. 7 shows in a graph the intended progression of a phase voltage during a load dump.

FIG. 7 shows an intended progression of a switching branch voltage for a load dump event. In this case, time is plotted on an abscissa 180 in ms and the phase voltage is plotted on an ordinate 182 in V. In this way, a continuously rising progression of the clamp voltage is predefined.

Figure 8:
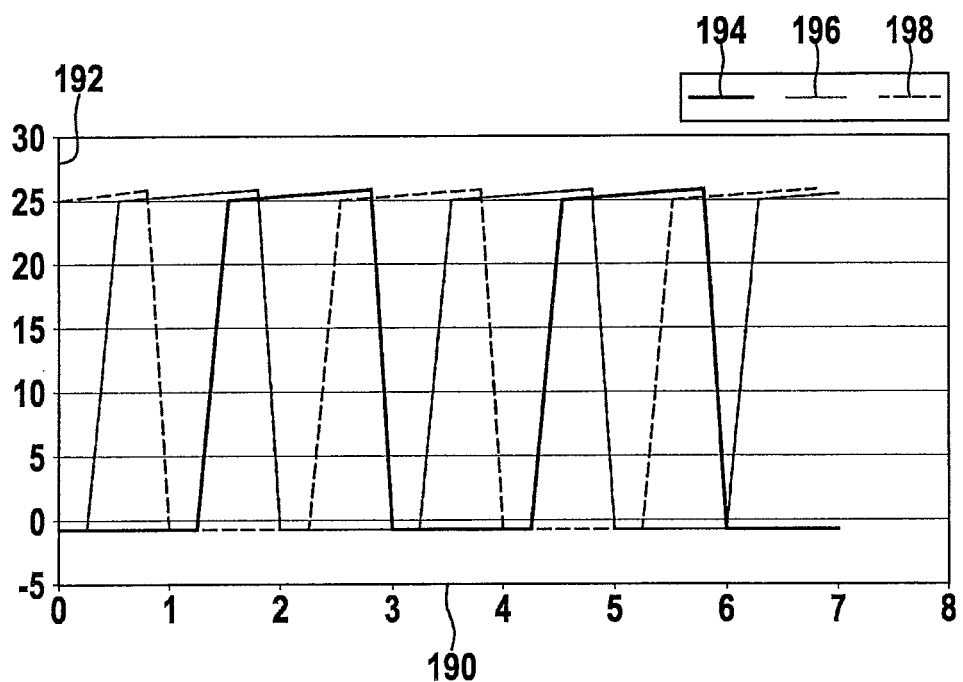
FIG. 8 shows in a graph the intended progression of phase voltages during a load dump.

FIG. 8 shows an intended progression of switching branch voltages for a load dump event in a three-phase system. Again, the time is plotted on an abscissa 190 in ms and the voltage is plotted on an ordinate 192 in V at three switching branches. The illustration shows as an example the progressions of the voltages at the low-side switching branches of phases U 194, V 196, and W 198. For the high-side switching branches, the same voltage progression is needed.

FIGS. 7 and 8 illustrate the presented method. Due to the ramp-shaped change in the clamp voltage in each switching branch within each half-wave of the voltage clamping, the clamp voltages of each switching branch considerably differ at each point in time. This is used to achieve a high portion of the current always being conducted via the switching branch having the presently lowest clamp voltage. The result of this method is an almost even distribution of the power loss among the switching branches averaged over time over multiple periods of the phase current.

It is to be noted that the increase in the clamp voltage is selected to be high enough to be able to compensate for the drop in the threshold voltage above the temperature.

The advantages over the related art are:
the largely even distribution of the power loss during the voltage clamping during a load dump event,
avoidance of the avalanche operation of MOSFETs during the load dump event,
maintenance of the voltage supply during the load dump event,
omission of complex power semiconductor technologies having thermally coupled, integrated Zener diodes or integrated temperature sensors,
avoidance of an increase in the clamp voltage within a load dump event.

In the representation of a circuit for voltage clamping from a MOSFET and Zener diodes according to FIG. 3, there is the possibility, for example, of placing the Zener diodes as an integral part of an ASIC together with the MOSFET on an assembly carrier. When placing the ASIC at a distance of approximately 1 cm from the MOSFET on a direct bonded copper (DBC) assembly carrier, a relatively high temperature difference dynamically results between the MOSFET and the ASIC during a load dump event. Due to this temperature difference, it is not possible under the above-mentioned conditions to compensate for the negative temperature coefficient of the MOSFET threshold voltage with the positive temperature coefficient of the Zener diodes integrated into the ASIC.

Figure 9:
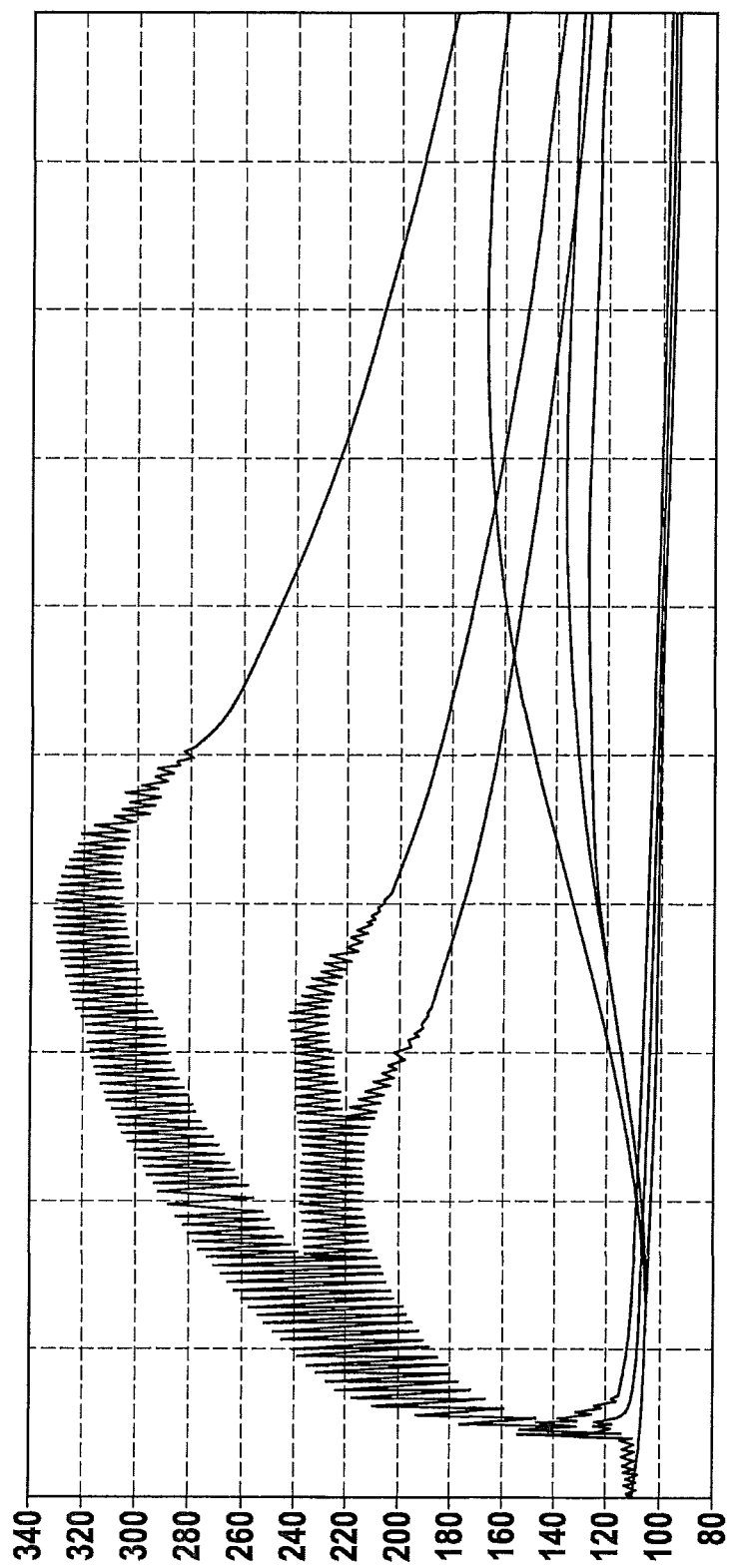
FIG. 9 shows in a graph the simulated temperature curve at three MOSFETs according to the related art.

FIG. 9 shows the simulated temperature curve at the MOSFET and the ASIC at a spatial distance of approximately 1 cm. Here, the time is plotted on an abscissa 200 in ms and the temperature is plotted on an ordinate 202. It is apparent that the simulated temperature of one of the six MOSFETs "decouples" from the other temperatures and combines the temperatures in itself as a result of the positive feedback effect. In the present simulation, one of the six switching branches would be subjected to a heating by ~200K, while the other switching branches are heated by 60K due to temperature compensation only after the load drop is completed.

If the algorithm explained above is now implemented in the ASIC, the MOSFETs are subjected to load relatively symmetrically, viewed on average. The temperature difference of the individual MOSFETs is significantly smaller. The hottest MOSFET is subjected to a heating by 90K and the coolest to a heating by 50K according to the simulation. Consequently, an extreme overload of individual switching branches, as in FIG. 9, does not occur.

Figure 10:
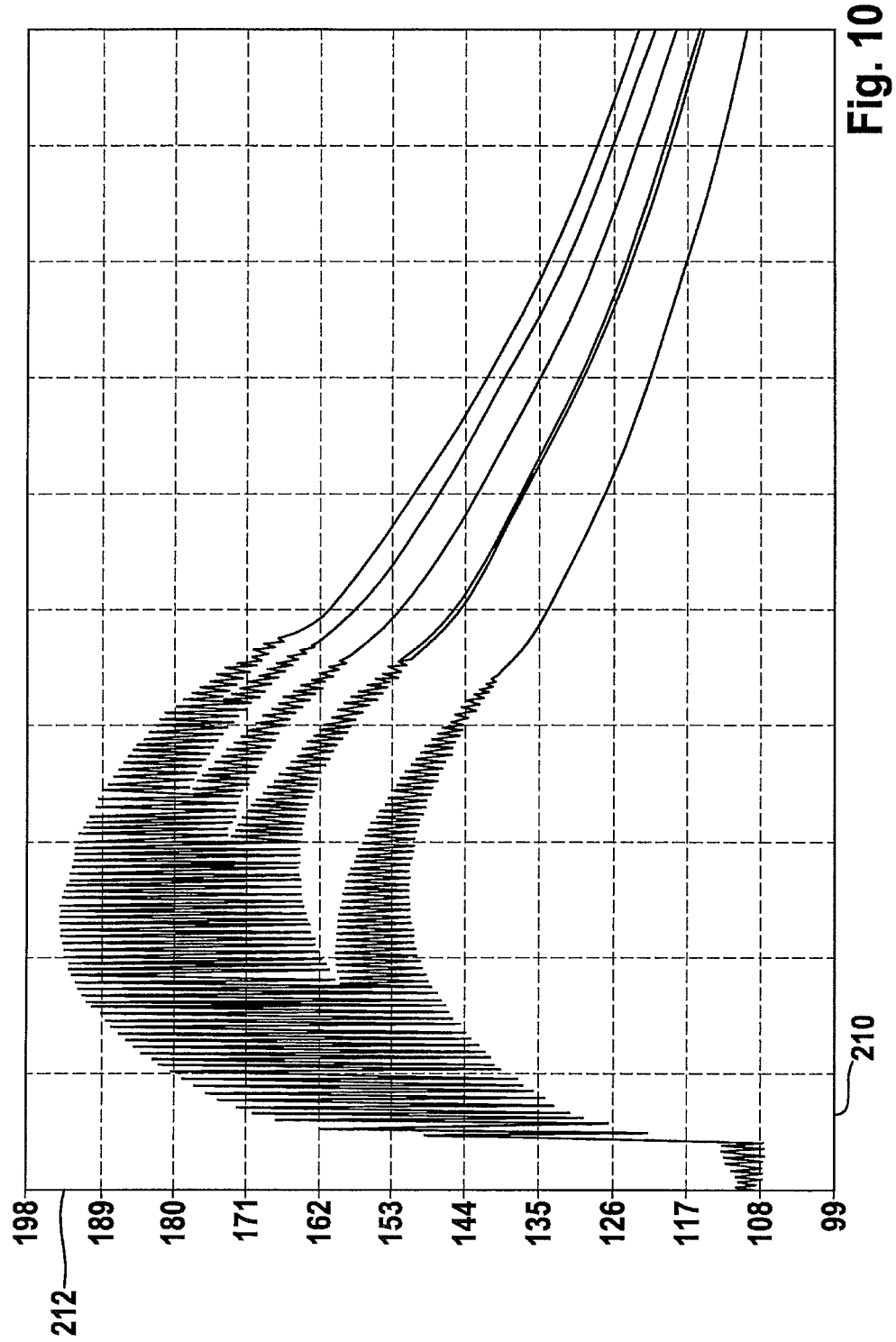
FIG. 10 shows in a graph the temperature curve at three MOSFETs after the introduction of improvements according to the present invention.

In FIG. 10, the temperature curve in the MOSFET is illustrated in the above-mentioned algorithm. Here, the time is plotted on an abscissa 210 in ms and the temperature is plotted on an ordinate 212.

Figure 11:
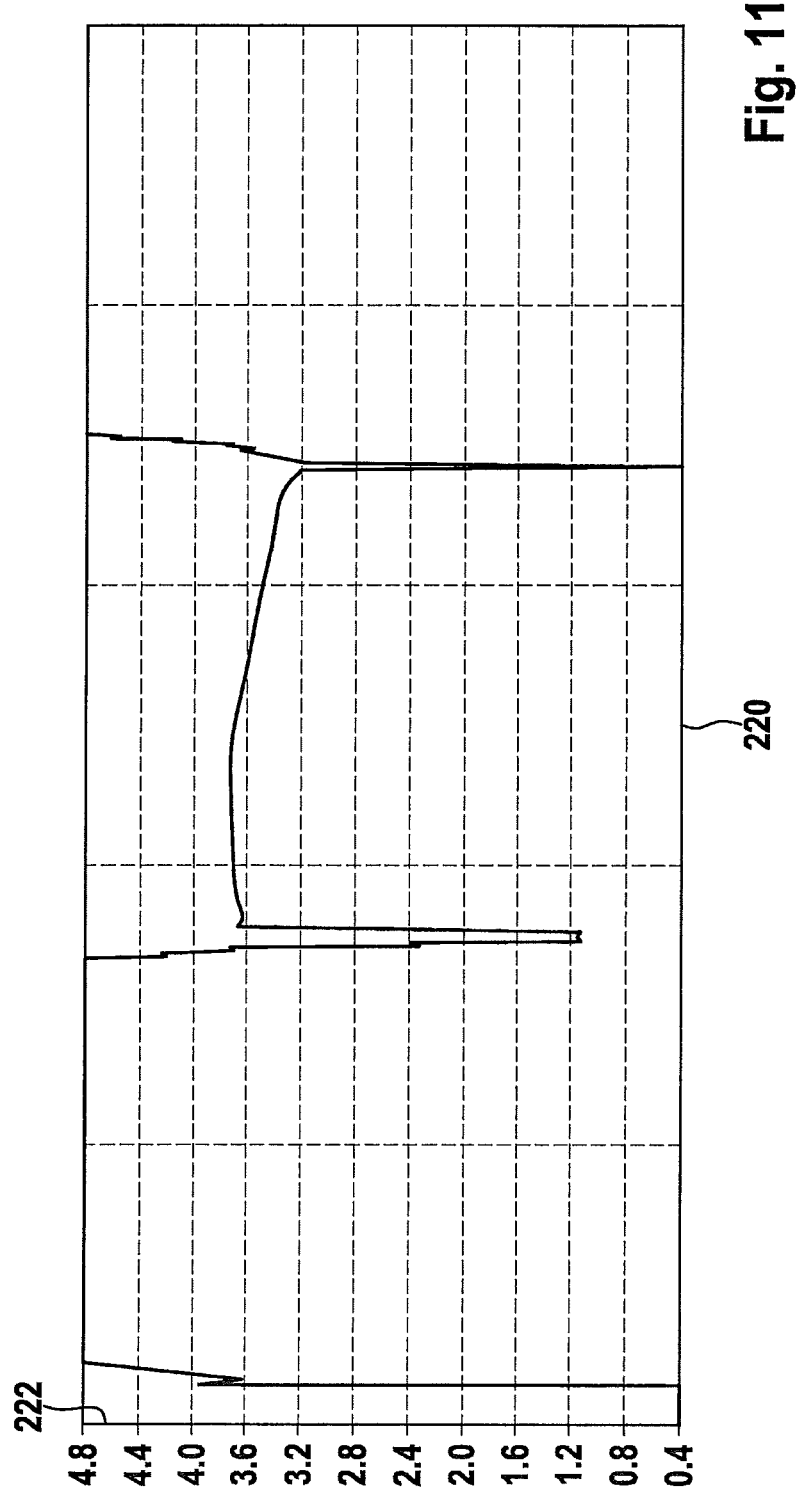
FIG. 11 shows in a graph the progression of the gate-source voltage after the introduction of improvements according to the present invention.

The presented algorithm is apparent by a negative voltage curve at the gate of the MOSFET, as illustrated in FIG. 11, for example. This Figure shows the progression of UGS at the MOSFET. Here, the time is plotted on an abscissa 220 in ms and the voltage is plotted on an ordinate 222 in V.

Due to the negative voltage progression, it is achieved that every MOSFET takes on the greatest energy at the beginning of a half-wave as a result of the high activating voltage and tightens its channel further in the course of the pulse by reducing the activating voltage, and consequently causes less and less energy to be taken in due to the greater resistance.

This effect may alternatively also be measured at the closed control unit between an arbitrary phase and Bat+ or Bat−. During the clamping operation at a constant clamping current, the increase in the clamp voltage, which is a function of time, may be measured. The measurement may take place at low currents, i.e., without noteworthy power input, to ensure that the measured clamp voltage is not influenced by temperature effects. The measurement may take place at a stationary generator in the laboratory by inputting an external clamping current into an arbitrary switching branch.

The result to be expected is shown in FIG. 7.

Alternatively or additionally to the method presented above, the problem of the even power loss distribution during a load dump event may be improved by monolithically integrating the Zener diode according to FIG. 3, necessary for activating the MOSFET, into a power switch.

Figure 12:
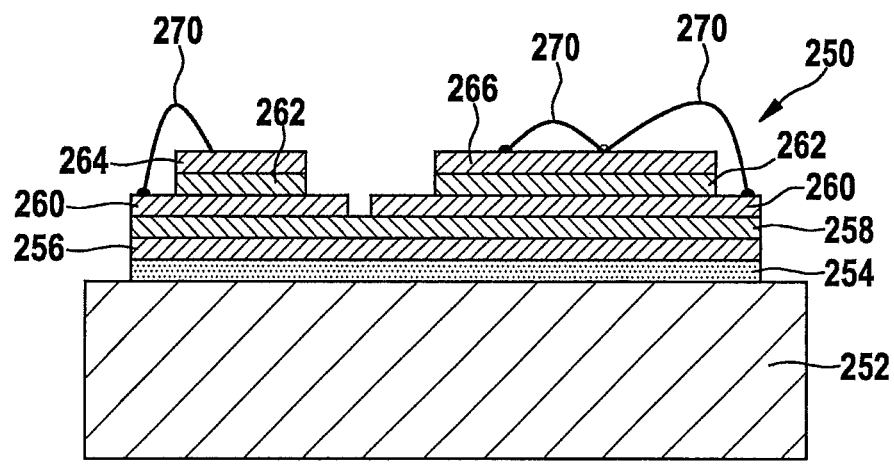
FIG. 12 shows a layered structure in the case of separated logic.

FIG. 12 shows a layered structure 250 with the logic being separated on DBC (direct bonded copper). The illustration shows a base plate 252, a first layer 254 made of a heat-conducting paste (HCP), a second layer 256 made of copper, a third layer 258 made of Al2O3, fourth layers 260 made of copper, fifth layers 262 made of solder, a layer 264 made of silicon for the ASIC, and a layer 266 made of silicon for the MOSFET. Furthermore, bond connections 270 are illustrated.

If the Zener diode is integrated into the activating circuit in such a way that it is spatially separated from the MOSFET, the temperature flow from the MOSFET, which heats up considerably during the load dump event, to the Zener diode takes place in a time-delayed manner. This delay is within a range of approximately 100 ms for the DBC structure shown in FIG. 12. In this way, the negative temperature coefficient of the MOSFET outweighs during the load dump event. A symmetrization is therefore not possible. The pulse is focused on three MOSFETs, one MOSFET taking up the greatest energy due to its lowest threshold voltage (positive feedback effect). The maximum temperature at the MOSFET reaches 330° C.

In the presented method, it is provided in one embodiment to obtain a symmetrization of the currents to the individual MOSFETs with the aid of a positive (viewed overall) temperature coefficient. This is implemented by the fact that a Zener diode is implemented in the MOSFETs in which the cathode is connected to the drain of the MOSFET, as illustrated in FIG. 12. The anode is guided to a separate pad of the MOSFET and is electrically connected to the activating circuit. In this way there is a direct thermal connection between the MOSFET and the Zener diode, as illustrated in FIG. 13.

Figure 13:
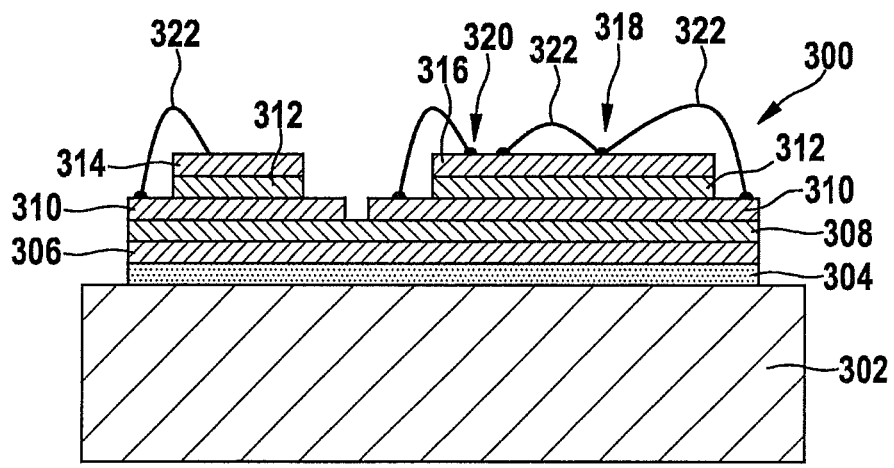
FIG. 13 shows the layered structure having a Zener diode integrated into the MOSFET.

FIG. 13 shows a layered structure 300 having a Zener diode integrated into the MOSFET. The illustration shows a base plate 302, a first layer 304 made of a heat-conducting paste (HCP), a second layer 306 made of copper, a third layer 308 made of Al2O3, fourth layers 310 made of copper, fifth layers 312 made of solder, a layer 314 made of silicon for the ASIC, and a layer 316 made of silicon, divided into a first area 318 for the MOSFET and a second area 320 for the Zener diode. Furthermore, bond connections 312 are illustrated.

The negative temperature coefficient of the threshold voltage of the MOSFET is overcompensated for by the positive temperature coefficient of the Zener diode of −14 mV/K, for example. In this way, an effect of the counter-coupling takes place, which results in the approximately even distribution of the power loss during the voltage clamping during the load dump event. The maximum temperature of the MOSFETs is thus reduced to 200° C. after simulation, as illustrated in FIG. 14.

Basically, the even distribution of the power loss is thus caused by the thermal coupling of a power semiconductor and a Zener diode.

Figure 14:
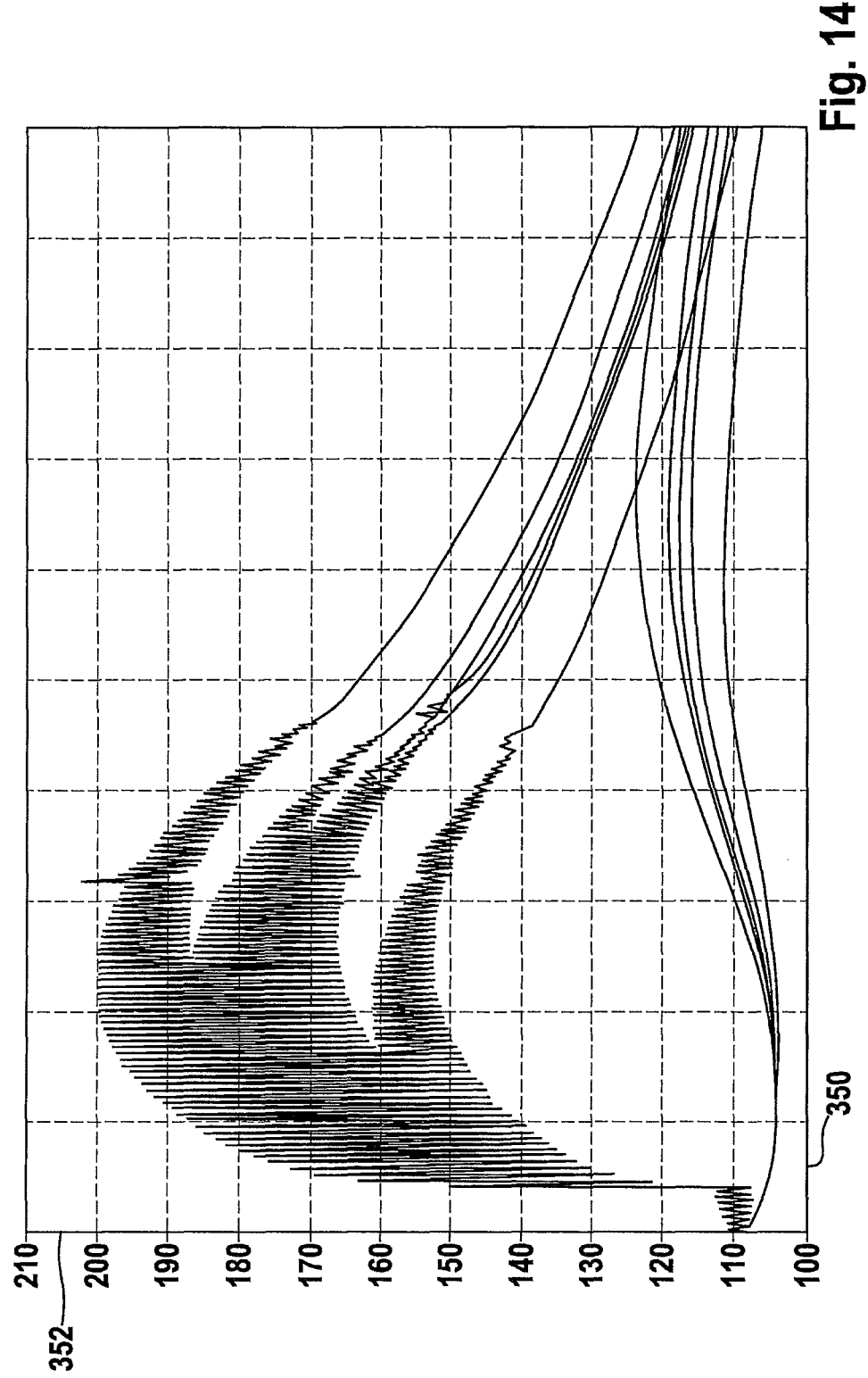
FIG. 14 shows in a graph the temperature curves of five MOSFETs having a Zener diode integrated into the MOSFET.

FIG. 14 shows a simulated temperature curve of rectifying elements including MOSFETs having integrated Zener diodes for a load dump event. Here, the time is plotted on an abscissa 350 in ms and the temperature is plotted on an ordinate 352.

In comparison to FIG. 9, a considerably better even distribution of the power loss, and consequently a more homogenous heating of the switching branches, is apparent.

The advantages over passive diode rectifiers are based on the fact that the clamp voltage does not drift upward over the entire load dump period, that the clamp voltage is tolerable in a closer range than in passive rectifiers, since hardly any current flows in the involved Zener diode, and that a smaller power loss occurs during the rectifier operation.

The advantages over the related art are:
the largely even distribution of the power loss during the voltage clamping during a load dump event in general and specifically also for the parallel circuit of rectifying elements,
avoidance of the avalanche operation of MOSFETs during the load dump event,
maintenance of the voltage supply during the load dump event.

In the illustration of a circuit for voltage clamping from a MOSFET and a Zener diode according to FIG. 3 having the monolithic integration of the MOSFET and the Zener diode, the leakage currents of the MOSFET are measurable if the anode connection of the Zener diode is not linked directly to the gate of the MOSFET. In this case, it is necessary to subsequently connect the anode connection of the Zener diode to the gate connection of the MOSFET via a bond connection. This connection may also be indirect via a separate circuit, such as a controlling ASIC, which is not integrated into the power chip. Leakage current measurements at the MOSFET may be necessary, depending on the requirements for ensuring functionality and reliability within the production sequence.

In another specific embodiment, the anode of the Zener diode may be connected directly, as an integral part of the integration, to the gate of the MOSFET during the monolithic integration of the MOSFET and the Zener diode.

FIG. 15 shows alternative wiring options in conjunction with the monolithic integration of the MOSFET and the Zener diode.

Two methods have been described above using which it is possible to achieve an approximately even distribution in the rectifying elements during the power losses converted during the voltage clamping. Subsequently, another method is shown which may be used as an alternative or in combination.

FIG. 3 shows a simple control loop which has a control of the clamp voltage. The reference variable of this control loop is primarily composed of the breakdown voltage of the Zener diode and the threshold voltage of the MOSFET. In the case that the Zener diode and the MOSFET are not monolithically integrated and therefore a comparably low thermal coupling exists between these two components, the negative temperature coefficient of the threshold voltage of the MOSFET cannot be compensated for by the positive temperature coefficient of the Zener diode in order to suppress the positive feedback effect as described previously.

Subsequently, an improved method for controlling the clamp voltage is described which noticeably suppresses the influence of the negative temperature coefficient of the threshold voltage of the MOSFET.

Figure 16:
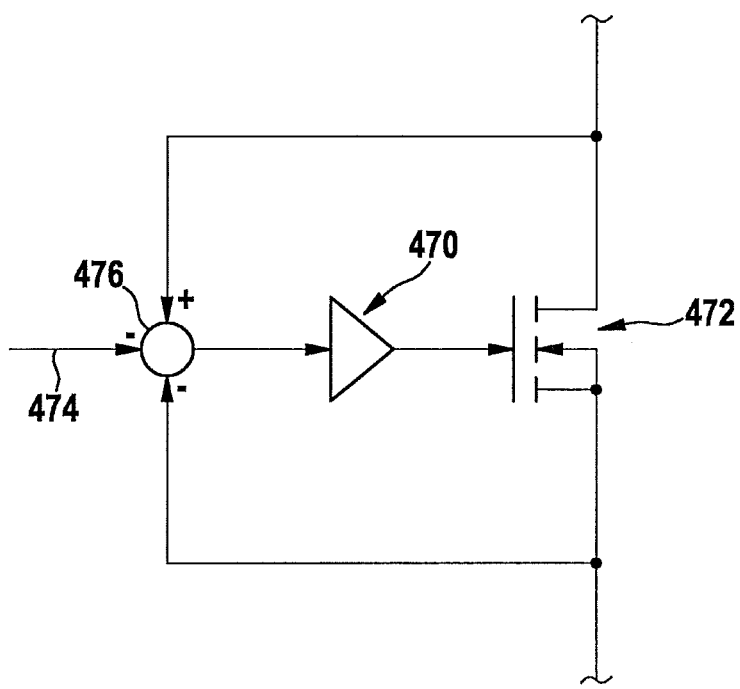
FIG. 16 shows a simplified diagram of a drain-source control.

FIG. 16 shows as an example a simplified diagram to illustrate the improved method for controlling the clamp voltage. The illustrated controller has a booster 470 and a MOSFET 472, as well as an adding element 476. Voltage U_setpoint 474 is used as the reference variable. Due to the effect of the control loop, the drain-source voltage of MOSFET 472 is adjusted almost to voltage U_setpoint. The lower is the deviation between the drain-source voltage of MOSFET 472 and voltage U_setpoint, the is higher the boost of booster 470. The threshold voltage of MOSFET 472 hardly affects the drain-source voltage of MOSFET 472 in the case of high boosts. When used as a circuit for voltage clamping, the influence of the negative temperature coefficient of the MOSFET threshold voltage on the clamp voltage is suppressed. The power loss converted during the voltage clamping in MOSFET 472 therefore causes almost no reduction of the clamp voltage, which suppresses largely a thermal parallel connection in the case of a parallel circuit of circuits for voltage clamping.

In this case, predefined voltage U_setpoint 474 may either be constant or increase over time, i.e., have a ramp-shaped characteristic. By using a ramp-shaped characteristic of U_setpoint, it is possible to combine this specific embodiment of the method with the first-mentioned specific embodiment of the method. The implementation of this improved method for controlling the clamp voltage and also the provision of ramp-shaped reference variables for the clamp voltage may, for example, take place as discrete circuits or by integrating the components into an ASIC or also largely digitally, e.g., by using microcontrollers or FPGAs.

The advantages over the related art are:
the largely even distribution of the power loss during the voltage clamping during a load dump event,
avoidance of the avalanche operation of MOSFETs during the load dump event,
maintenance of the voltage supply during the load dump event,
omission of complex power semiconductor technologies having thermally coupled, integrated Zener diodes or integrated temperature sensors.

The efficiency of the described measure may be proven based on simulations.

FIG. 17 shows the simulated temperature curves of the MOSFETs of the six switching branches of a rectifier during operation including a three-phase generator for a load dump event. The above-mentioned methods for evenly distributing the power loss are not used here, since a circuit principle according to FIG. 3 is used. FIG. 17 shows on an abscissa 480 the time in ms and temperature T is plotted on an ordinate 482.

FIG. 18 shows the simulated temperature curves of the MOSFETs of the six switching branches of a rectifier during operation using a three-phase generator for a load dump event. Here, the above-mentioned method for controlling the clamp voltage according to the circuit principle illustrated in FIG. 16 is used. FIG. 18 shows on an abscissa 490 the time in ms and temperature T is plotted on an ordinate 492.

It is clearly apparent in FIG. 18 that the bandwidth of the output stage temperatures is considerably narrower due to the utilization of the above-mentioned method for controlling the clamp voltage under boundary conditions which are otherwise identical. This results in a lower maximum temperature for the individual MOSFETs.

What is claimed is:

1. A method for activating a rectifier, which has active switching elements, the method comprising:
activating the active switching elements of the rectifier during a voltage clamping so that a clamp voltage in each switching branch of a corresponding one of the active switching elements complies with a ramp-shaped change in a signal form predefined as a function of time within each half-period of a current to be rectified;
wherein the ramp-shaped change in the clamp voltage is in each of the switching branches within a corresponding one of each half-wave of the voltage clamping for each of the active switching elements, and
wherein power converted during the voltage clamping during a load dump is distributed to each of the active switching elements of the switching branches so that substantially homogeneous heating occurs for each of the active switching elements.

2. The method of claim 1, wherein the clamp voltage in at least one of the switching branches is adjusted to the predefined signal form using one controller in each case.

3. The method of claim 1, wherein a thermal coupling is carried out between a power switch and at least one Zener diode.

4. The method of claim 1, wherein every switching element includes at least one MOSFET.

5. The method of claim 3, wherein every MOSFET is monolithically integrated together with at least one Zener diode.

6. The method of claim 4, wherein every MOSFET is activated as a quadripole.

7. The method of claim 1, wherein the active switching elements of the rectifier are activated using an activating circuit.

8. The method of claim 7, further comprising:
a controller for controlling control signals for the active switching elements.

9. A rectifier, comprising:
active switching elements, each of which is to be acted on by a control signal, for activating an activating circuit to activate the active switching elements during a voltage clamping so that a clamp voltage in each switching branch of a corresponding one of the active switching elements complies with a ramp-shaped change in a signal form predefined as a function of time within each half-period of the current to be rectified;
wherein the ramp-shaped change in the clamp voltage is in each of the switching branches within a corresponding one of each half-wave of the voltage clamping for each of the active switching elements, and
wherein power converted during the voltage clamping during a load dump is distributed to each of the active switching elements of the switching branches so that substantially homogeneous heating occurs for each of the active switching elements.

10. An electric generator, comprising:
a rectifier, including active switching elements, each of which is to be acted on by a control signal, for activating an activating circuit to activate the active switching elements during a voltage clamping so that a clamp voltage in each switching branch of a corresponding one of the active switching elements complies with a ramp-shaped change in a signal form predefined as a function of time within each half-period of the current to be rectified;
wherein the ramp-shaped change in the clamp voltage is in each of the switching branches within a corresponding one of each half-wave of the voltage clamping for each of the active switching elements, and
wherein power converted during the voltage clamping during a load dump is distributed to each of the active switching elements of the switching branches so that substantially homogeneous heating occurs for each of the active switching elements.

11. The generator of claim 10, wherein the clamp voltage in the at least one switching branch is adjusted to the predefined signal form using one controller in each case.

12. The generator of claim 10, wherein a thermal coupling is carried out between a power switch and at least one Zener diode.

13. The generator of claim 10, wherein every switching element includes at least one MOSFET.

14. The generator of claim 12, wherein every MOSFET is monolithically integrated together with at least one Zener diode.

15. The generator of claim 13, wherein every MOSFET is activated as a quadripole.

16. The generator of claim 10, wherein the active switching elements of the rectifier are activated using an activating circuit.

17. The generator of claim 16, further comprising:
a controller for controlling control signals for the active switching elements.

* * * * *